US008894722B2

(12) United States Patent
Lu et al.

(10) Patent No.: US 8,894,722 B2
(45) Date of Patent: Nov. 25, 2014

(54) CONSTRUCTION OF PLANAR RECHARGEABLE OXIDE-ION BATTERY CELLS AND STACKS USING STAINLESS STEEL HOUSING STRUCTURES

(75) Inventors: Chun Lu, Sewickley, PA (US); Kevin P. Litzinger, Level Green, PA (US)

(73) Assignee: Siemens Aktiengesellschaft, München (DE)

( * ) Notice: Subject to any disclaimer, the term of this patent is extended or adjusted under 35 U.S.C. 154(b) by 741 days.

(21) Appl. No.: 13/167,900

(22) Filed: Jun. 24, 2011

(65) Prior Publication Data

US 2012/0328972 A1    Dec. 27, 2012

(51) Int. Cl.
| | | |
|---|---|---|
| *H01M 6/00* | (2006.01) | |
| *H01M 4/76* | (2006.01) | |
| *H01M 12/08* | (2006.01) | |
| *H01M 4/36* | (2006.01) | |
| *H01M 4/90* | (2006.01) | |
| *H01M 2/02* | (2006.01) | |
| *H01M 4/48* | (2010.01) | |
| *H01M 2/20* | (2006.01) | |
| *H01M 4/38* | (2006.01) | |

(52) U.S. Cl.
CPC .... *H01M 4/9033* (2013.01); *H01M 2300/0074* (2013.01); *H01M 2/027* (2013.01); *Y02E 60/50* (2013.01); *H01M 4/76* (2013.01); *H01M 4/48* (2013.01); *H01M 12/08* (2013.01); *H01M 2/208* (2013.01); *H01M 2220/10* (2013.01); *H01M 4/362* (2013.01); *H01M 4/38* (2013.01); *H01M 2/0255* (2013.01); *H01M 2/0285* (2013.01)
USPC ........................................................ 29/623.1

(58) Field of Classification Search
USPC ................. 429/535, 402, 403, 405, 508, 469; 29/623.1, 623.2, 623.4
See application file for complete search history.

(56) References Cited

U.S. PATENT DOCUMENTS

| | | | |
|---|---|---|---|
| 4,054,729 A | 10/1977 | Isenberg | |
| 6,399,247 B1 | 6/2002 | Kitayama et al. | |
| 6,878,482 B2 * | 4/2005 | Tzeng | 429/66 |
| 7,396,612 B2 | 7/2008 | Ohata et al. | |
| 2006/0063051 A1 * | 3/2006 | Jang | 429/29 |
| 2008/0268327 A1 | 10/2008 | Gordon et al. | |
| 2011/0033769 A1 | 2/2011 | Huang et al. | |
| 2011/0256448 A1 | 10/2011 | Huang et al. | |
| 2012/0129058 A1 * | 5/2012 | Litzinger et al. | 429/403 |

FOREIGN PATENT DOCUMENTS

| | | |
|---|---|---|
| DE | 102009057720 A1 | 6/2011 |
| WO | 2012033623 A1 | 3/2012 |

OTHER PUBLICATIONS

Chun Lu et al., Oxidation-Resistant Metal Supported Rechargeable Oxide-Ion Battery Cells and Methods to Produce the Same, U.S. Appl. No. 12/876,391, filed Sep. 7, 2010, 1-9 pgs.

* cited by examiner

*Primary Examiner* — Raymond Alejandro

(57) ABSTRACT

Processing steps for constructing a rechargeable oxide-ion battery (ROB) cell using a cell membrane assembly 40 and a hollow metal housing structure 30 wherein assembly steps include: a) forming a membrane assembly 40 of air electrode 20, metal electrode 24 and electrolyte 22 therebetween; b) sealing the membrane assembly 40 to a surrounding frame 26; c) filling the hollow metal housing structure 30 with active material 32; d) forming electrical contact between the framed membrane assembly and the filled housing structure; and e) joining the framed membrane assembly and the active housing structure to form a ROB cell.

16 Claims, 6 Drawing Sheets

CONSTRUCTION OF PLANAR RECHARGEABLE OXIDE-ION BATTERY CELLS AND STACKS USING STAINLESS STEEL HOUSING STRUCTURES

BACKGROUND OF THE INVENTION

1. Field of the Invention

This present invention relates to engineering methods for constructing rechargeable oxide-ion battery (ROB) cells and stacks. More specifically, the invention details the processing steps using a cell membrane assembly and a stainless steel housing structure.

2. Description of Related Art

Electrical energy storage is crucial for the effective proliferation of an electrical economy and for the implementation of many renewable energy technologies. During the past two decades, the demand for the storage of electrical energy has increased significantly in the areas of portable, transportation, load-leveling and central backup applications. The present electrochemical energy storage systems are simply too costly to penetrate major new markets. Higher performance is required, and environmentally acceptable materials are preferred. Transformational changes in electrical energy storage science and technology are in great demand to allow higher and faster energy storage at lower costs and longer lifetimes necessary for major market enlargement. Most of these changes require new materials and/or innovative concepts, with demonstration of larger redox capacities that react more rapidly and reversibly with cations and/or anions.

Batteries are by far the most common faun of storing electrical energy, ranging from: standard every day lead—acid cells, nickel-metal hydride (NiMH) batteries taught by Kitayama in U.S. Pat. No. 6,399,247 B1, metal-air cells taught by Isenberg in U.S. Pat. No. 4,054,729, and to the lithium-ion battery taught by Ohata in U.S. Pat. No. 7,396,612 B2. These latter metal-air, nickel-metal hydride and lithium-ion battery cells require liquid electrolyte systems.

Batteries range in size from button cells used in watches, to megawatt load leveling applications. They are, in general, efficient storage devices, with output energy typically exceeding 90% of input energy, except at the highest power densities.

Rechargeable batteries have evolved over the years from lead-acid through nickel-cadmium and nickel-metal hydride (NiMH) to lithium-ion batteries. NiMH batteries were the initial workhorse for electronic devices such as computers and cell phones, but they have almost been completely displaced from that market by lithium-ion batteries because of the latter's higher energy storage capacity. Today, NiMH technology is the principal battery used in hybrid electric vehicles, but it is likely to be displaced by the higher power energy and now lower cost lithium batteries, if the latter's safety and lifetime can be improved. Of the advanced batteries, lithium-ion is the dominant power source for most rechargeable electronic devices.

What is needed is a dramatically new electrical energy storage device that can easily discharge and charge a high capacity of energy quickly and reversibly, as needed. What is also needed is a device that can operate for years without major maintenance. What is also needed is a device that does not need to operate on natural gas, hydrocarbon fuel or its reformed by-products such as $H_2$. One possibility is a rechargeable oxide-ion battery (ROB), as set out, for example, in application Ser. No. 12/695,386, filed on Jan. 28, 2010 (now, U.S. Patent Publication No. US 2011/0033769), and application Ser. No. 12/876,391, filed on Sep. 7, 2010 (now, U.S. Patent Publication No. US 2012/0058396).

A ROB comprises a metal electrode, an oxide-ion conductive electrolyte, and a cathode. The metal electrode undergoes reduction-oxidation cycles during charge and discharge processes for energy storage. The working principles of a rechargeable oxide-ion battery cell 10 are schematically shown in FIG. 1. In discharge mode, oxide-ion anions migrate from high partial pressure of the oxygen side (air electrode-12) to low partial pressure of the oxygen side (metal electrode-14) under the driving force of the gradient oxygen chemical potential. Electrolyte is shown as 16. There exist two possible reaction mechanisms to oxidize the metal. One of them, solid-state diffusion reaction as designated as Path 1, is that oxide ion can directly electrochemically oxidize metal to form metal oxide. The other, gas-phase transport reaction designated as Path 2, involves generation and consumption of gaseous phase oxygen. The oxide ion can be initially converted to a gaseous oxygen molecule on a metal electrode, and then further reacts with metal via solid-gas phase mechanism to form metal oxide. In charge mode, the oxygen species, released by reducing metal oxide to metal via electrochemical Path 1 or solid-gas mechanism Path 2, are transported from a metal electrode back to an air electrode.

During discharge/charge cycles metal redox reactions induce significant volume variation, for instance, if iron (Fe) metal is used, the volume change associated with the reaction of $Fe + \frac{1}{2} O_2 = FeO$ is 1.78 times. Therefore, the metal electrode must be appropriately designed so that the drastic volume variation can be properly accommodated. For energy storage application, oxide ion must be transported across the electrolyte between a metal electrode and a cathode to carry electrical charge. Therefore, the metal electrode must be hermetically sealed to prevent direct contact with an oxygen-containing environment (for example, air). Otherwise, oxygen in air will directly consume the metal without involving charge transfer between electrodes, which will lead to self discharge.

The cell voltage for each individual ROB cell is limited in most cases, for practical applications where certain voltage output is demanded, ROB cells must be connected together to form a stack to raise the voltage of a ROB device. Thus, there is a need of engineering methods to construct a ROB stack using single ROB cells. It is a main object of this invention to provide ROB cell and stack designs that supply the above needs by using cost-effective materials and processing techniques.

SUMMARY OF THE INVENTION

The above needs for producing a ROB cell and stack are supplied and object accomplished by utilizing a cell membrane assembly, stainless steel housing structure, seal(s), and electrical collector(s). The construction of the planar ROB cell and stack, has an oxidation resistant metal housing, such as nickel-based alloys, chromium-based alloys or iron-based alloys, preferably stainless steel. The planar design, compared with tubular designs, reduces cell Ohmic loss. Both electrolyte supported and skeleton supported cells can be accommodated in the planar design. The ROB cell of this invention uses brazing and welding seals to separate active metal components from air, and also has compliant cell-to-cell current collectors.

The above object is accomplished by providing a process for constructing a rechargeable oxide-ion battery (ROB) cell comprising the steps:

a) forming a membrane assembly of a top air electrode, a bottom negative metal electrode and a middle contacting ceramic electrolyte which extends beyond the contacting electrode(s);

b) sealing the extending sides of the ceramic electrolyte surface of the membrane assembly to a surface of a metallic frame which surrounds the membrane assembly, to form a framed membrane assembly;

c) incorporating active metal components into hollow portions of a metal housing structure to form an active housing structure;

d) forming electrically conductive contact between the framed membrane assembly and the active housing structure; and e) joining the framed membrane assembly and the active housing structure, using a process selected from brazing and welding or their combination to form an ROB cell.

The invention also includes a process for constructing multiple ROB cell stacks comprising the further steps of:

f) forming electrical contact between two cells by installing a cell to cell collector between the air electrode of a first ROB cell and the central section of the bottom surface of the active housing structure of a successive second ROB cell made as described above; and g) forming an insulation seal between the top surface of the picture frame described above of the peripheral section of the first ROB cell and the bottom peripheral section of a second successive ROB cell made as described above.

Preferably, the bottom negative electrode is a metal electrode.

BRIEF DESCRIPTION OF THE DRAWINGS

For a better understanding of the invention, reference may be made to the preferred embodiments exemplary of this invention, shown in the accompanying drawings in which.

DESCRIPTION OF THE PREFERRED EMBODIMENTS

The requirements of a ROB cell include:

a) an air electrode for reversible conversion of oxygen into an oxide ion ($O^{2-}$) that carries/has two electrical charges;

b) an oxide-ion conductive electrolyte for transporting electrical charge in the form of $O^{2-}$;

c) a metal electrode where electrical charge associated with the oxide-ion is stored or released by an active metal component(s), and for accommodating the volume change associated with a metal redox reaction;

d) a reliable seal separating direct contact between air and active metal; and e) cost effectiveness.

Figure 1:
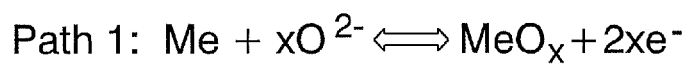
FIG. 1 illustrates the known working principals of a rechargeable oxide-ion battery (ROB) cell.
Figure 1:
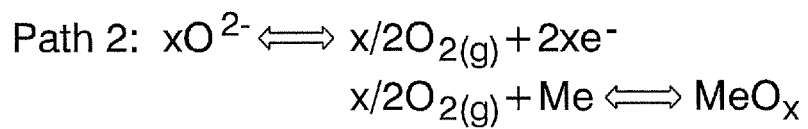
Figure 1:
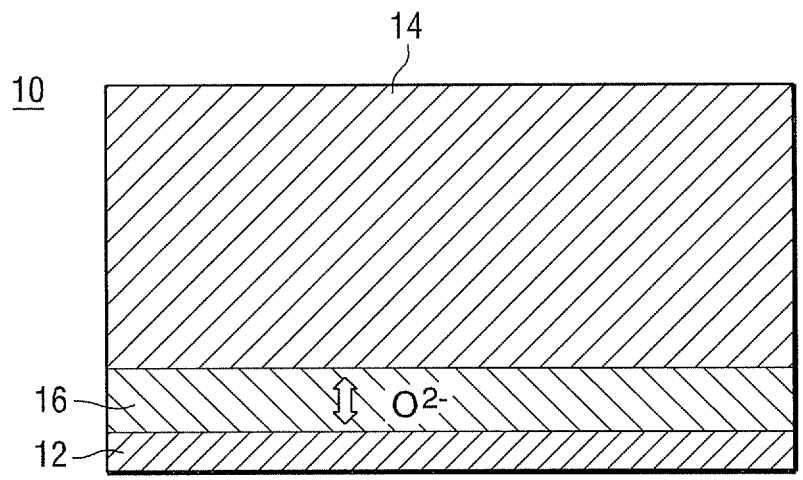
Figure 1:
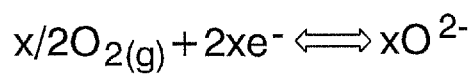
Figure 2A:
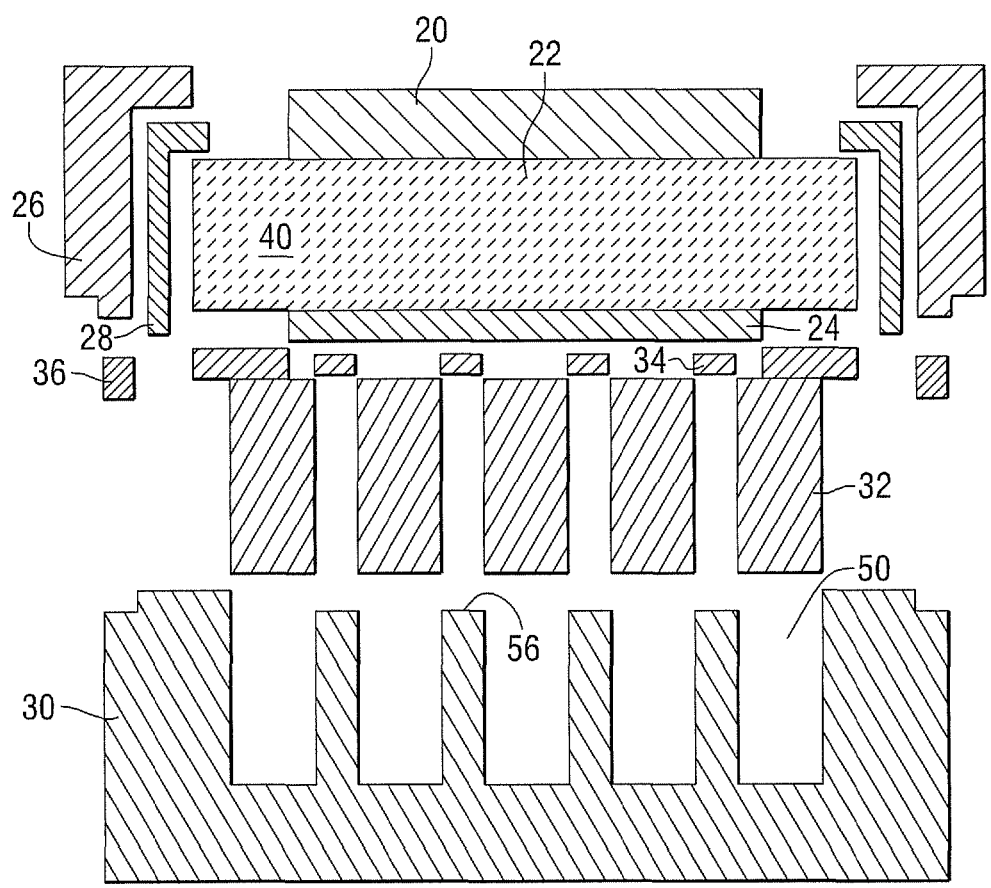
FIGS. 2A and 2B, which best describe the invention, are schematic illustrations of joining together a planar ROB cell of this invention, showing component arrangement (FIG. 2A), and a complete cell (FIG. 2B)
Figure 2B:
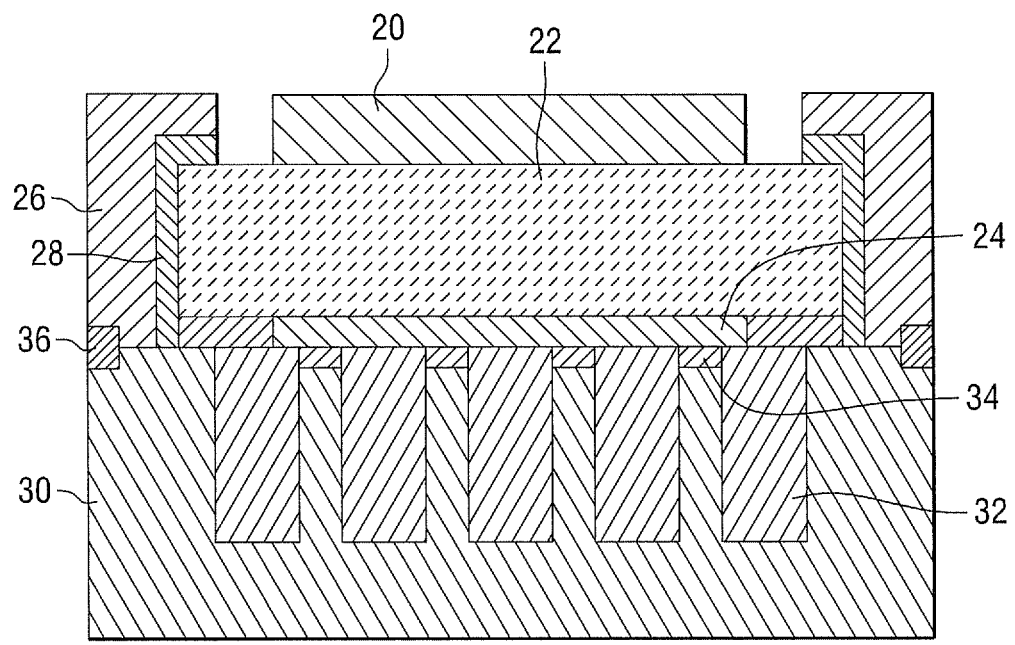

Referring now to FIGS. 2A and 2B, which show a schematic illustration of joining components (2A), and which show a finished planar ROB cell (2B). The top air electrode is shown as 20, while 22 shows a sandwiched ceramic middle electrolyte, and 24 shows the bottom metal electrode. Components 20, 22 and 24 together form a membrane assembly, generally shown as 40, best shown in FIG. 3. In FIGS. 2A and 2B, 26 shows a surrounding metallic frame, which is herein defined as a "picture frame." A seal 28 connects the membrane assembly 40 to the picture frame 26. A metal housing structure 30 is shown, where active material 32 will fill the metal housing pockets or holes 50. An electrical current collector 34 is shown between the metal housing structure 30 and the bottom metal electrode 24, best shown in FIG. 2B, while 36 shows the seal connecting the picture frame 26 and the metal housing structure 30.

Figure 3:
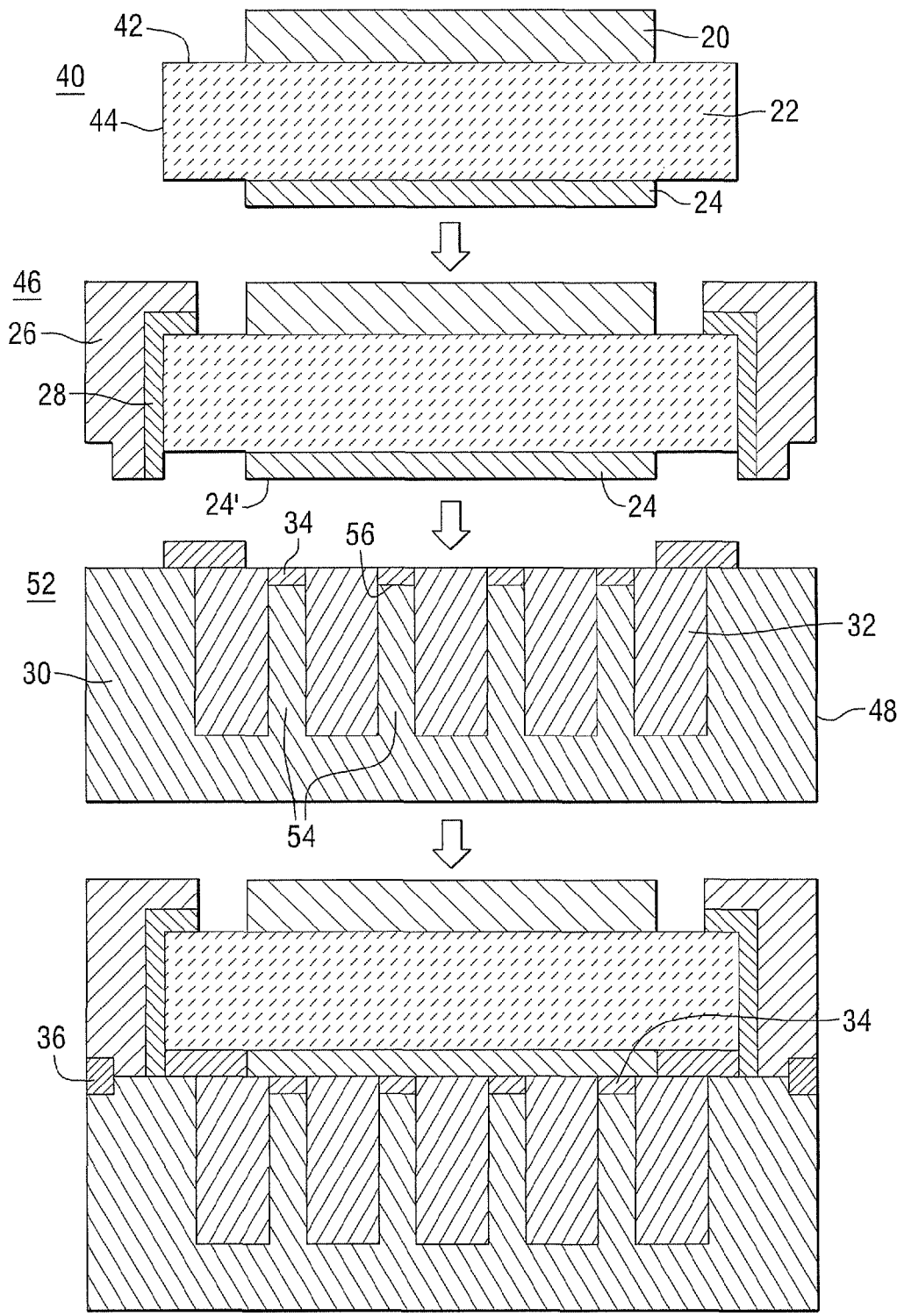
FIG. 3 summarizes the exemplary processing steps of construction of a planar cell of this invention in a step by step detail.

Referring now to FIG. 3, an exemplary ROB cell fabrication process is illustrated. In step 1, a membrane assembly 40 is formed having a top air electrode 20, a bottom metal electrode 24 and a middle ceramic electrolyte 22. These three components can be adhered together by classic materials processing techniques involving forming, tape casting, tape calendaring, screen printing, extrusion, and pressing followed by high-temperature sintering. Useful air electrodes include, for example, doped $LaMnO_{3-z}$, $LaCoO_{3-z}$, $LaCo_xFe_{1-x}O_{3-z}$, $Sm_ySr_{1-y}CoO_{3-z}$, doped ceria, stabilized zirconia, doped/updoped $La_aSr_{1-a}Ga_bMg_{1-b}O_{3-z}$, doped $Bi_2O_3$ and their mixture, where x=0 to 1, y=0.2 to 0.7, z=0.001 to 0.1, a=0.5 to 1, and b=0.6 to 1. Useful ceramic electrolytes include oxide ion conductive materials, for example, doped $CeO_2$, stabilized zirconia, doped/updoped $La_aSr_{1-a}Ga_bMg_{1-b}O_{3-z}$, and their mixture.

Useful bottom metal electrodes include, for example, electronically conductive materials, such as electrically conductive ceramics, silver, gold, platinum, palladium, nickel, copper, stainless steel, and any of their mixtures.

Continuing with FIG. 3, a metallic frame 26, made of oxidation-resistant alloy, is configured to surround the membrane assembly 40 as a "picture frame," where the inside perimeter of the metallic frame 26 contains a seal 28 that contacts the inside of metallic frame 26 and top surface 42 and side ends 44 of the ceramic electrolyte 22. Useful seals include, for example, glass, ceramic, brazing alloys, or a combination of the two. Finally, the components are heat treated to provide a framed membrane assembly 46.

Additionally, a hollow oxidation-resistant metal alloy housing structure 30, having sides 48 and interior pockets/holes/pores 50 (refer to FIG. 2A) is provided. Chromium-based alloy, Ni-based alloys or Fe-based alloys can be selected to fabricate the metal housing structure 30. Stainless steel is preferable, however, in this invention because of its low cost, resistance against oxidation, and its reasonable thermal expansion match with membrane assembly 40. Active material components 32 are comprised of any single-phase metal or metal oxide material selected from the group consisting of Ti, Ce, Cr, Mn, Fe, Co, Ni, Cu, Mo, and W, and of any two-phase material selected from the group consisting of Ti—$TiO_2$, Ce—$CeO_2$, Cr—$Cr_2O_3$, Mn—$Mn_2O_3$, Mn—$Mn_3O_4$, Mn—MnO, Fe—FeO, Fe—$Fe_3O_4$, Fep—$Fe_2O_3$, Co—CoO, Co—$Co_3O_4$, Co—$Co_2O_3$, Ni—NiO, Cu—$Cu_2O$, Cu—CuO, Mo—$MoO_2$, Mo—$MoO_3$, and W—$WO_3$, preferably Fe, Fe oxide and Fe alloyed with other elements including, for example, Cu, Mo, W and Mn. The active material 32 is incorporated into the interior pockets 50, to provide an active housing structure 52. The interior skeleton of the housing structure 30 can have, for example, a plurality of transverse members 54, as shown, slightly shorter to accommodate electrical current collectors 34.

Electrical current collectors 34 (also see FIGS. 2A and 2B) are also applied between the bottom surface 24' of the metal electrode 24 and the top surface 56 of the plurality of transverse members 54 of the metal housing structure. Useful current collectors 34 include metals, for example, Pt, Ag, Au, Ni, Cu, alloys, and electrically conductive ceramics such as doped/undoped $CeO_2$, stabilized zirconia, doped/undoped $La_xSr_{1-x}Ga_yMg_{1-y}O_{3-z}$, doped $LaCrO_{3-z}$, doped $SrTiO_{3-z}$, doped $LaVO_{3-z}$, $Gd_2Ti_xMo_{1-x}O_7$, $Sr_2Mg_{1-x}Mn_xMoO_{6-z}$, and any of their mixtures, where x=0.5 to 1, y=0.6 to 1 and z=0.001 to 0.1. Then framed membrane assembly 46 and active housing structure 52 are then sealed together as shown by use of seal 36 which can include glass, welding, cement, ceramics, brazing, or combinations to form a planar rechargeable oxide-ion battery (ROB) cell supported by a metal housing structure.

Figure 4:
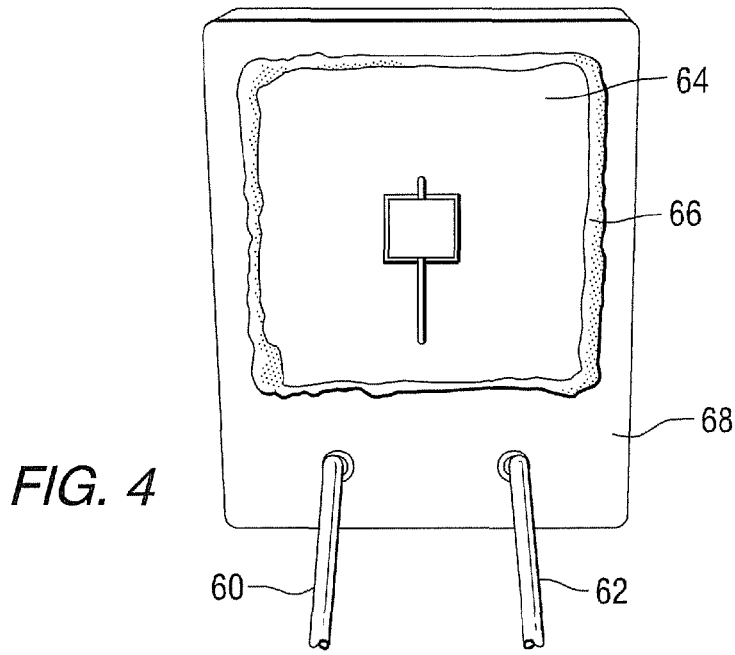
FIG. 4 shows a three-dimensional schematic view of a tested proof-of-concept ROB cell.
Figure 5:
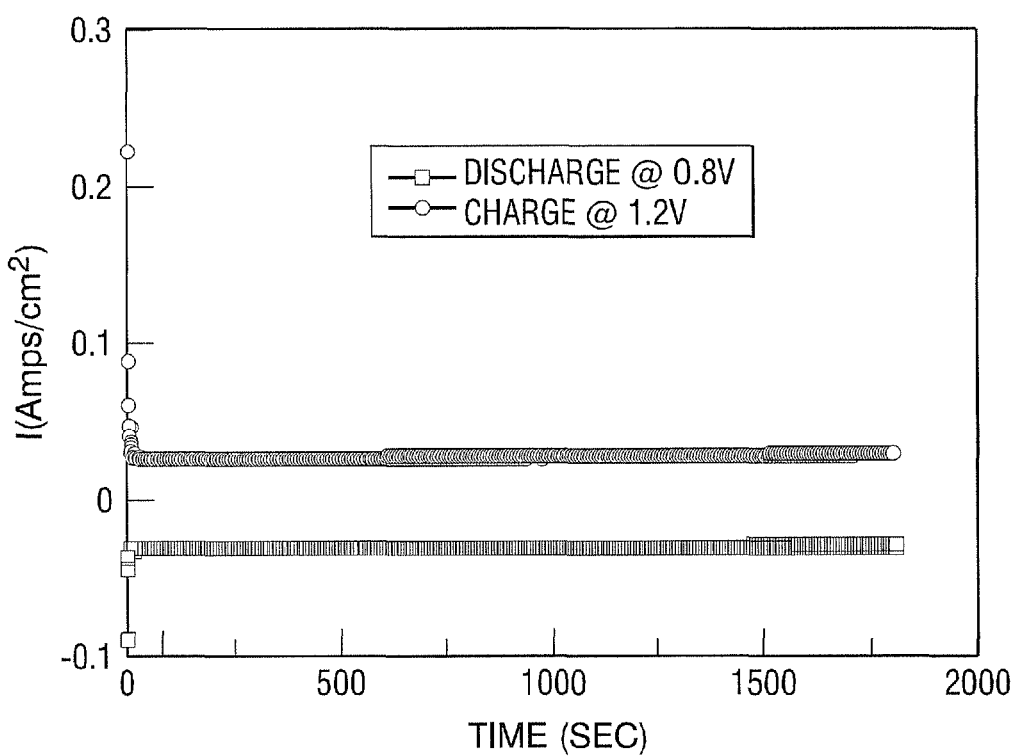
FIG. 5 shows the discharge/charge curves of the proof-of-concept ROB cell of this invention at 785° C.

Example: a proof-of-concept cell, similar in structure and materials most respects to FIG. 2B was made; using a stainless steel (430SS) housing structure. A commercial "HION-ICS®" electrolyte membrane was purchased from Fuel Cell Material and was nominally 150-μm (micrometers) thick. A porous platinum air electrode and a porous platinum metal electrode were attached to the electrolyte membrane to form the cell membrane assembly 64. Then the assembly was sealed onto a stainless steel picture frame 68 using a ceramic adhesive sold commercially as Aremco "CERAMA-BOND552®" 66. Iron sponge active material powder (Alfa Aesar) was loaded into the pocket of a metal housing structure made of stainless steel. A Pt current collector was established between the porous Pt metal electrode and the metal housing structure. The picture frame and the metal housing structure were then welded together to form a ROB cell, as shown in FIG. 4. To facilitate electrochemical testing, gas inlet 60 and outlet 62 were created by welding stainless steel tubes through the picture frame. The cell electrical performance was measured at 785° C. during constant voltage discharge/charge. As shown in FIG. 5, the cell displayed a steady-state current density of about 30 mA/cm² during charging at 1.2V for 1800 seconds. The bottom negative value curve shows current density at discharge at 0.8V for 1800 seconds. Such steady performance based on these two curves validates the feasibility of the ROB cell of this invention.

Figure 6:
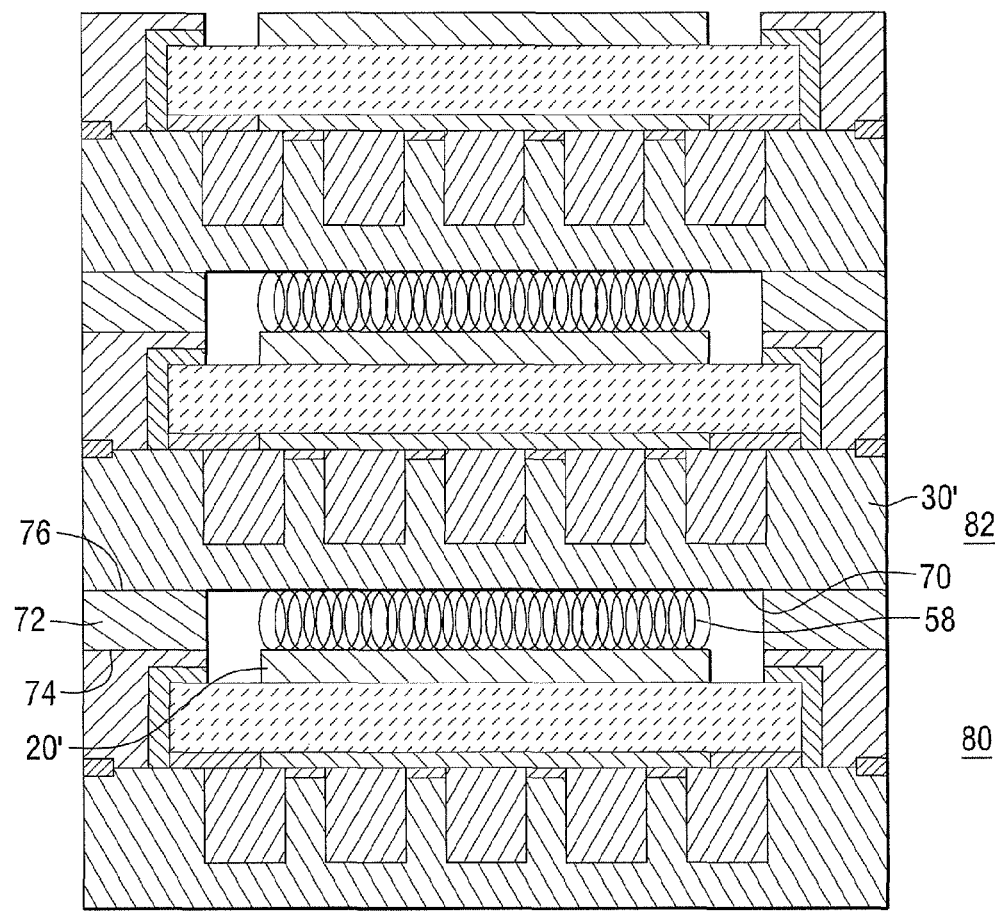
FIG. 6 is a schematic illustration of a planar ROB battery stack of a plurality of electrically connected cells according to this invention.

Referring to FIG. 6, this invention also describes the processing steps for assembling a ROB stack; using the constructed cells including: e) installing cell-to-cell current collector 58 between the air electrode 20' of a first ROB cell 80, and the central section of the bottom surface 70 of the metal housing structure 30' of a second successive ROB cell 82; and f) forming insulation seal 72 between the top surface 74 of the picture frame of the first ROB cell and the bottom peripheral section 76 of the metal housing structure of the second successive ROB cell. Useful cell-to-cell current collectors include, for example, metal/alloy screen or a contact paste made of metal or electrically conductive ceramic such as doped $LaMnO_{3-z}$, $LaCoO_{3-z}$, $LaCo_xFe_{1-x}O_{3-z}$, $Sm_ySr_{1-y}CoO_{3-z}$, where x is=0 to 1, y=to 0.2 to 0.7 and z=0.001 to 0.1. Useful insulation seals 72 includes, for example, mica and/or glass.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A process for constructing a rechargeable oxide-ion battery cell comprising the steps:
   a) forming a membrane assembly of a top air electrode, a bottom negative metal electrode and a middle contacting ceramic electrolyte which extends beyond either the top air electrode, the bottom air electrode or both the top and bottom air electrodes;
   b) sealing extending sides of the middle contacting ceramic electrolyte to a surface of a metallic frame which surrounds the membrane assembly to form a framed membrane assembly;
   c) incorporating active material into hollow portions of a metal housing structure to form an active housing structure;
   d) forming electrically conductive contact between the framed membrane assembly and the active housing structure; and
   e) joining the framed membrane assembly and the active housing structure to form a rechargeable oxide-ion battery cell.

2. A process for constructing a rechargeable oxide-ion battery multiple-cell stack comprising the additional steps of:
   f) after step e), forming electrical contact between two cells by installing a cell-to-cell current collector between an air electrode of a first rechargeable oxide-ion battery cell made according to claim 1 and a central section of a bottom surface of the active housing structure of a second rechargeable oxide-ion battery cell; and then
   g) forming an insulation seal between a top surface of a frame of the first rechargeable oxide-ion battery cell and a bottom peripheral section of the second rechargeable oxide-ion battery cell.

3. The process for constructing the rechargeable oxide-ion battery cell of claim 1, wherein the top air electrode in step 1a) comprises electronically conductive materials selected from the group consisting of doped $LaMnO_{3-z}$, $LaCoO_{3-z}$, $LaCo_xFe_{1-x}O_{3-z}$, $Sm_ySr_{1-y}CoO_{3-z}$, doped cerin, stabilized zirconia, doped/updoped $La_aSr_{1-a}Ga_bMg_{1-b}O_{3-z}$, doped $Bi_2O_3$ and their mixture, where x=0 to 1, y 0.2 to 0.7, z=0.001 to 0.1, a=0.5 to 1, and b=0.6 to 1.

4. The process fore constructing the rechargeable oxide-ion battery cell of claim 1, wherein the middle contacting ceramic electrolyte in step 1a) comprises oxide-ion, conductive materials selected from the group consisting of doped $CeO_2$, stabilized zirconia, doped/updoped $La_aSr_{1-a}Ga_bMg_{1-b}O_{3-z}$, and their mixture, where z=0.001 to 0.1, a=0.5 to 1, and b=0.6 to 1.

5. The process for constructing the rechargeable oxide-ion battery cell of claim 1, wherein the bottom negative metal electrode in step 1a) comprises electronically conductive materials.

6. The process for constructing the rechargeable oxide-ion battery cell of claim 1, wherein the metallic frame in step 1b) comprises oxidation-resistant alloy.

7. The process for constructing the rechargeable oxide-ion battery cell of claim 1, wherein the sealing in step 1b) comprises a sealing process that includes use of a material selected from the group consisting of: glass, ceramic, braze, or combination thereof.

8. The process for constructing the rechargeable oxide-ion battery cell of claim 1, wherein the sealing in step 1b) comprises a brazing process performed at a temperature between 850° C. and 1100° C. to provide a braze seal of from 0.001 millimeter to 1 millimeter thickness.

9. The process for constructing the rechargeable oxide-ion battery cell of claim 1, wherein the metal housing structure in step 1c) comprises stainless steel.

10. The process for constructing the rechargeable oxide-ion battery cell of claim 1, wherein the percentage of hollow space of the metal housing structure in step 1c) is from 10% to 90%, and the thickness of the metal housing structure is from 0.1 millimeter to 20 millimeter.

11. The process for constructing the rechargeable oxide-ion battery cell of claim 1, wherein the active material in step 1c) comprise mixture of metal and metal oxide, and additives.

12. The process for constructing the rechargeable oxide-ion battery cell of claim 1, wherein the electrically conductive contact in step 1d) comprises a material selected from the group consisting of silver, gold, platinum, palladium, nickel, copper, or electrically-conductive ceramics, or metal-ceramic composites.

13. The process for constructing the rechargeable oxide-ion battery cell of claim 2, wherein the cell-to-cell current collector in step 2f) includes a metal/alloy screen or a contact paste made of metal or electrically conductive ceramic.

14. The process for constructing the rechargeable oxide-ion battery cell of claim 2, wherein the insulation seal in step 2g) comprises at least one of glass, cement, welding, ceramics or brazing.

15. The process for constructing the rechargeable oxide-ion battery cell of claim 5, wherein the bottom negative metal electrode is selected from the group of electrically conductive materials consisting of: silver, gold, platinum, palladium, nickel, copper, stainless steel, and any of their mixtures and combinations thereof.

16. The process for constructing the rechargeable oxide-ion battery cell of claim 13, wherein the metal/alloy screen or a contact paste is made of a metal or electrically conductive ceramic selected from the group consisting of: doped/undoped $CeO_2$, stabilized zirconia, doped/undoped $La_xSr_{1-x}Ga_yMg_{1-y}O_{3-z}$, doped $LaCrO_{3-z}$, doped $SrTiO_{3-z}$, doped $LaVO_{3-z}$, $Gd_2Ti_xMo_{1-x}O_7$, $Sr_2Mg_{1-x}Mn_xMoO_{6-z}$, and any of their mixtures, where x=0.5 to 1, y=0.6 to 1 and z=0.001 to 0.1.

* * * * *